Figure 2:
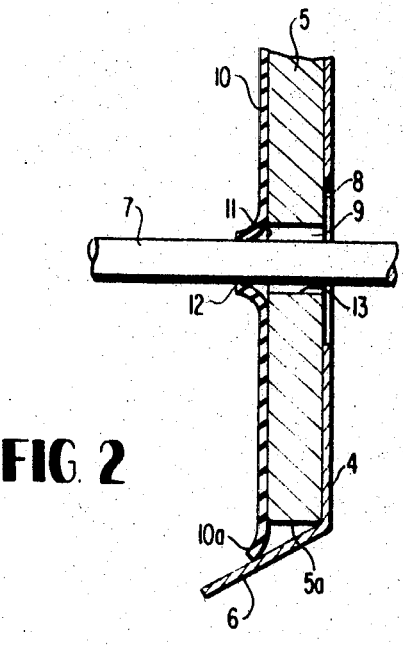

United States Patent

[11] 3,613,825

| [72] | Inventor | Rolf Maier<br>Sindelfingen, Germany |
|---|---|---|
| [21] | Appl. No. | 22,485 |
| [22] | Filed | Mar. 25, 1970 |
| [45] | Patented | Oct. 19, 1971 |
| [73] | Assignee | Daimler-Benz Aktiengesellschaft<br>Stuttgart-Unterturkheim, Germany |
| [32] | Priority | Mar. 28, 1969 |
| [33] | | Germany |
| [31] | | P 19 16 097.5 |

[54] SOUND-ABSORBING COATING FOR THE PARTITION WALL OF A MOTOR VEHICLE
8 Claims, 2 Drawing Figs.

[52] U.S. Cl. .................................................. 181/33 G
[51] Int. Cl. ................................................. G10k 11/04
[50] Field of Search ........................................... 181/33 R,
33.1, 33.03; 180/89, 90; 296/70; 277/95

[56] References Cited
UNITED STATES PATENTS

| 1,801,786 | 4/1931 | Woodall et al. | 296/70 X |
| 1,812,385 | 6/1931 | Troyer | 277/95 X |
| 1,945,717 | 2/1934 | Woodall | 296/70 |
| 1,947,788 | 2/1934 | McIntyre | 296/70 |
| 2,028,950 | 1/1936 | Randall | 296/70 X |
| 3,429,728 | 2/1969 | Goldstone et al. | 181/33 X |

*Primary Examiner*—Richard B. Wilkinson
*Assistant Examiner*—Stanley A. Wal
*Attorney*—Craig, Antonelli, Stewart & Hill

ABSTRACT: A sound-absorbing coating for the partition wall of a motor vehicle in which the partition wall and coating are provided with substantially aligned openings for the passage therethrough of a part such as a cable, a pipe, a linkage or the like; the coating is provided on the surface opposite the partition wall with an elastic cover which closes off the opening in the coating; an opening in the cover is elastically expanded when the part is extended through the same.

PATENTED OCT 19 1971

3,613,825

INVENTOR
ROLF MAIER

BY
Craig, Antonelli, Stewart & Hill
ATTORNEYS

SOUND-ABSORBING COATING FOR THE PARTITION WALL OF A MOTOR VEHICLE

The present invention relates to a sound-absorbing coating for the partition wall of a motor vehicle which is provided at least with an opening in alignment with an opening of the partition wall for the passage therethrough of a cable, pipe, linkage part or the like.

It is known in the prior art to insert into the opening of the partition wall the larger end, larger in diameter, of a conical, elastic, sleeve-shaped spout or funnel, whose narrower end is mounted under elastic expansion on the cable or the like extending through the partition wall. The two openings of the partition wall and of the coating have to be relatively wide also for assembly reasons so that the sound absorption is impaired.

The present invention aims at eliminating these disadvantages. For this purpose a coating is proposed in accordance with the present invention in which the orifice of the opening opposite the partition wall is covered off by an elastic cover or film which is adhesively connected with the coating. As a result thereof rubber funnels or spouts are economized and the openings can be constructed narrower so that the sound absorption is improved. Furthermore, dirt deposits which settle at the funnels or spouts are avoided thereby. A further advantage of the present invention resides in that the cylindrical sectional areas of the openings in the sound-absorbing coating need no longer be sealed against the penetration of water, gasoline or oil. These liquids enhance decaying or decomposition of the porous coating.

The elastic cover may project over the edge of the sound-absorbing coating whereby the projecting part abuts sealingly against the partition wall as cover against dirt and aggressive liquids. The optical and aesthetic impression is thereby advantageously improved at the same time.

Accordingly, it is an object of the present invention to provide a sound-absorbing coating for the partition wall of a motor vehicle which avoids the aforementioned shortcomings and drawbacks.

Another object of the present invention resides in the construction of a sound-absorbing partition wall for a motor vehicle which is simple and relatively inexpensive yet improves the sound-absorbing characteristics thereof.

A further object of the present invention resides in a sound-absorbing coating for the separating wall of a motor vehicle which avoids the need for the time-consuming installation of bush-shaped funnels or spouts as well as of costly seals.

Figure 1:
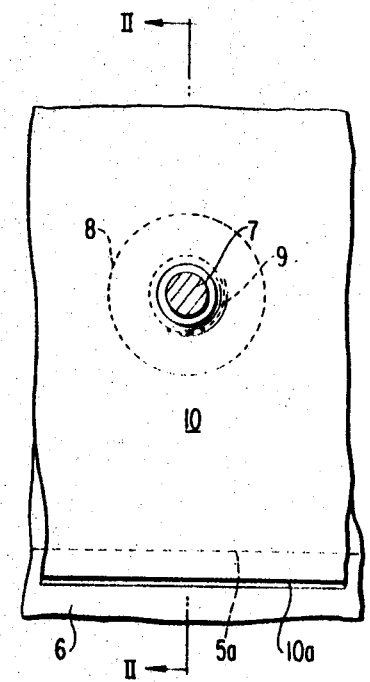

These and further objects, features and advantages of the present invention will become more obvious from the following description when taken in connection with the accompanying drawing which shows, for purposes of illustration only, one embodiment in accordance with the present invention and wherein:

FIG. 2 is a partial elevational view of the partition wall, seen in the direction of the elastic film, in accordance with the present invention and FIG. 2 is a partial cross-sectional view taken along line II—II of FIG. 1.

Referring now to the drawing wherein like reference numerals are used throughout the two views to designate like parts, the partition wall 4 consists of sheet metal and is securely bonded or glued to or adhesively connected in any other known manner with a sound-absorbing coating 5 of any conventional type. The parts 4 and 5 are provided with aligned openings 8 and 9 for the passage of a cable 7 forming part, for example, of a pull cable or similar linkage. An elastic cover or film 10 is glued on the surface of the coating 5 opposite the partition wall 4 which covers the orifice 11 of the opening 9 and is mounted over the cable 7 under elastic enlargement of a hole 12 aligned with the opening 9. In this manner the cylindrical sectional area 13 of the porous coating 5 is protected against the penetration of aggressive liquids and need not be sealed separately. This is also true for the edge surface 5a of the coating 5 which is protected by a projecting part 10a of the elastic film 10 that abuts sealingly against the inclined wall part 6 of the partition wall. 4. The opening 9 is narrower than the opening 8 to that the sound absorption is better than with an arrangement in which the diameters are stepped in the reverse sequence.

While I have shown and described only one embodiment in accordance with the present invention, it is understood that the same is not limited thereto but is susceptible of numerous changes and modifications as known to those skilled in the art. For example, the sound-absorbing coating 5 may consist of a layer of any known material suited for that purpose while the cover 10 may be made from any suitable film material. The separating wall 4, the coating 5 the tee cover 10 may be adhesively bonded or secured to each other in any other suitable manner. Thus, it is obvious that the present invention is not limited to the details shown and described herein and I therefore do not wish to be limited to the same but intend to cover all of such changes and modifications are encompassed by the scope of the appended claims.

I claim:

1. A sound-absorbing coating for the partition wall of a motor vehicle which is provided at least with one opening for a part such as a cable, pipe, linkage or the like, in alignment with an opening in the partition wall, characterized in that the orifice of the opening of said coating opposite the partition wall is covered by an elastic cover means which is adhesively connected to said coating.

2. A sound-absorbing coating according to claim 1, characterized in that the elastic cover means projects beyond the edge of said coating and the projecting part of said cover means sealingly abuts against said partition wall.

3. A sound-absorbing coating according to claim 2, characterized in that the opening of said coating is at most equal to the opening of the partition wall.

4. A sound-absorbing coating according to claim 2, characterized in that the opening of said coating is smaller than the opening of the partition wall.

5. A sound-absorbing coating according to claim 3, characterized in that said cover means is formed by an elastic film provided with an opening that is mounted over said part under elastic expansion of said last-mentioned opening.

6. A sound-absorbing coating according to claim 1, characterized in that the opening of said coating is at most equal to the opening of the partition wall.

7. A sound-absorbing coating according to claim 1, characterized in that the opening of said coating is smaller than the opening of the partition wall.

8. A sound-absorbing coating according to claim 1, characterized in that said cover means is formed by an elastic film provided with an opening tat is mounted over said part under elastic expansion of said last mentioned opening.